United States Patent
Chalfin et al.

(10) Patent No.: US 10,599,935 B2
(45) Date of Patent: Mar. 24, 2020

(54) PROCESSING ARTIFICIAL NEURAL NETWORK WEIGHTS

(71) Applicant: ARM Limited, Cambridge (GB)

(72) Inventors: Alexander Eugene Chalfin, Mountain View, CA (US); Hardik Sharma, Atlanta, GA (US); Thomas Jeremy Olson, San Jose, CA (US)

(73) Assignee: Arm Limited, Cambridge (GB)

( * ) Notice: Subject to any disclaimer, the term of this patent is extended or adjusted under 35 U.S.C. 154(b) by 294 days.

(21) Appl. No.: 15/439,284

(22) Filed: Feb. 22, 2017

(65) Prior Publication Data

US 2018/0239992 A1    Aug. 23, 2018

(51) Int. Cl.
*G06K 9/00* (2006.01)
*G06N 3/08* (2006.01)
*G06K 9/46* (2006.01)
*G06N 3/04* (2006.01)

(52) U.S. Cl.
CPC ....... *G06K 9/00986* (2013.01); *G06K 9/4642* (2013.01); *G06N 3/0454* (2013.01); *G06N 3/084* (2013.01)

(58) Field of Classification Search
CPC ............. G06K 9/00986; G06K 9/4642; G06N 3/0454; G06N 3/084
See application file for complete search history.

(56) References Cited

U.S. PATENT DOCUMENTS

| | | | |
|---|---|---|---|
| 2008/0055331 A1* | 3/2008 | Iourcha | G06T 9/00 345/582 |
| 2012/0281005 A1 | 11/2012 | Nystad | |
| 2012/0281006 A1 | 11/2012 | Nystad | |
| 2012/0281007 A1 | 11/2012 | Nystad | |
| 2012/0281925 A1 | 11/2012 | Nystad | |
| 2015/0228050 A1 | 8/2015 | Nystad | |
| 2015/0235384 A1 | 8/2015 | Nystad | |
| 2017/0220925 A1* | 8/2017 | Alsharif | G06N 3/08 |
| 2018/0082181 A1* | 3/2018 | Brothers | G06N 3/082 |
| 2018/0138921 A1* | 5/2018 | Arelakis | H03M 7/6088 |

* cited by examiner

*Primary Examiner* — Ping Y Hsieh
(74) *Attorney, Agent, or Firm* — Vierra Magen Marcus LLP

(57) ABSTRACT

A data processing apparatus processes a set of weight values for an artificial neural network by representing the set of weight values in the form of an array of weight values and by using an image compression scheme to provide compressed weight data for the artificial neural network. The data processing apparatus uses an image decompression scheme to derive decompressed weight values from the compressed weight data and applies the decompressed weight values when producing a result from an input to the artificial neural network. The data processing apparatus can provide for efficient storage and processing of the weight values for the artificial neural network.

11 Claims, 10 Drawing Sheets

PROCESSING ARTIFICIAL NEURAL NETWORK WEIGHTS

BACKGROUND

The technology described herein relates to the processing of a set of weight values for an artificial neural network.

Artificial neural networks have many different applications, often related to classification tasks such as image or speech recognition. Artificial neural networks typically comprise an input layer that receives an input, one or more intermediate layers (such as activation layers, convolutional layers, pooling layers, fully connected layers, etc.), and an output layer that provides a result. Weight values are typically applied at layers, or at interconnections between layers, to produce a result from an input to the artificial neural network.

For example, in the case of image recognition, the input to the artificial neural network typically comprises a set of (e.g. colour or luminance) input values that represent an image and the result typically comprises one or more values that indicate whether or not a particular feature is deemed by the artificial neural network to be present in the image.

The Applicants believe that there remains scope for improved arrangements when processing weight values for artificial neural networks.

BRIEF DESCRIPTION OF THE DRAWINGS

Various embodiments of the technology described herein will be described by way of example only and with reference to the accompanying drawings, in which.

Figure 1:
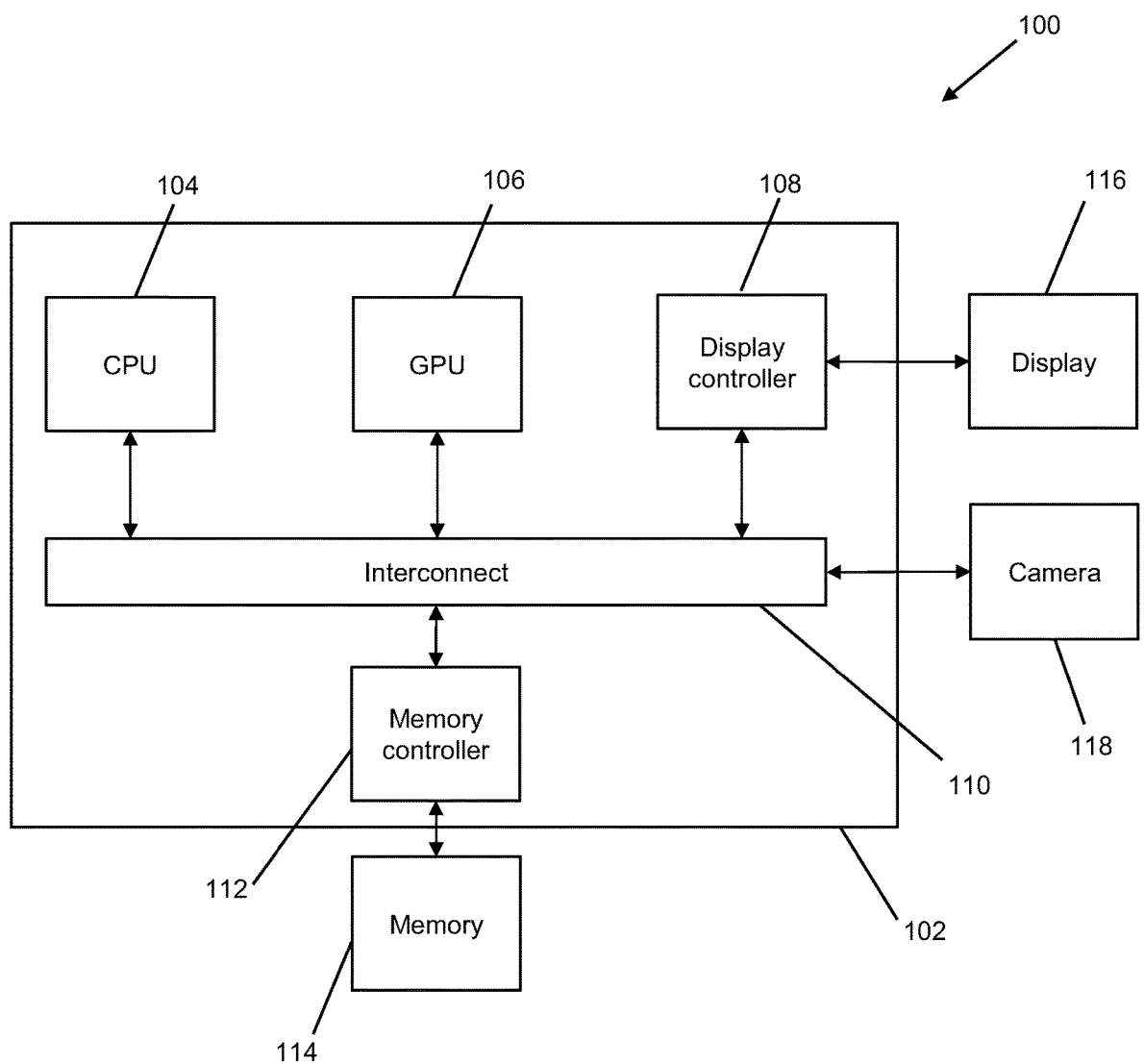
FIG. 1 shows schematically a data processing system comprising a data processing apparatus according to an embodiment of the technology described herein.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of processing a set of weight values for an artificial neural network, the method comprising:

representing a set of weight values for an artificial neural network in the form of an array of weight values; and using an image compression scheme to compress the array of weight values to provide compressed weight data for the artificial neural network.

Another embodiment of the technology described herein comprises a data processing apparatus for processing a set of weight values for an artificial neural network, the data processing apparatus comprising processing circuitry configured to:

represent a set of weight values for an artificial neural network in the form of an array of weight values; and use an image compression scheme to compress the array of weight values to provide compressed weight data for the artificial neural network.

The Applicants have recognised that, in many complex applications, the number of weight values for an artificial neural network (such as an artificial neural network having many layers and/or interconnections) can be extremely large, and thus the weight values for an artificial neural network can comprise a large amount of data. The Applicants have also identified that it would be desirable to compress the weight values for an artificial neural network, for example so as to reduce the amount of bandwidth and/or storage needed when transferring and/or storing the weight values for use in the artificial neural network.

The Applicants have further identified that, whilst generic compression schemes might be used to compress the weight data, a set of weight values for an artificial neural network can be represented as an array of weight values which can then be compressed using an image compression scheme. The Applicants have further identified that using an image compression scheme to compress weight data can, surprisingly, have a number of benefits in the context of artificial neural networks. This is despite the fact that weight data, unlike graphics or image data, is often spatially uncorrelated and thus would not immediately be considered as being suited for compression using an image compression scheme.

Furthermore, data processing apparatus, e.g. of portable devices such as laptops, cell phones, tablets, etc., typically comprise processing circuitry (e.g. the processing circuitry of a graphics processor or image processor) already designed to perform image compression schemes and/or image decompression schemes, albeit for compressing and/or decompressing graphics or image data rather than weight data for artificial neural networks. The Applicants have further identified that such processing circuitry may be used when compressing a set of weight values for an artificial neural network, in effect by compressing the set of weight values as though it were an array of graphics or image data. Similarly, such processing circuitry may be used when decompressing compressed weight data to derive decompressed weight values for an artificial neural network, in effect by decompressing the compressed weight data as though it were compressed graphics or image data.

Thus, in embodiments, a graphics processor or image processor may be used to compress the array of weight values using the compression scheme to provide the compressed weight data for the artificial neural network. Similarly, in embodiments, a graphics processor or image processor may be used to derive decompressed weight values from the compressed weight data for the artificial neural network using an image decompression scheme. These embodiments can provide an efficient reuse of processing circuitry in a data processing apparatus and/or allow a data processing apparatus, e.g. of a system or device having limited data storage, to store and/or use weight data for an artificial neural network so as to be able to implement that artificial neural network.

However, in some embodiments, a different processor (such as a (e.g. dedicated) neural network processor) may be used to compress the array of weight values using the compression scheme to provide the compressed weight data for the artificial neural network. Similarly, in some embodiments, a different processor (such as a (e.g. dedicated) neural network processor) may be used to derive decompressed weight values from the compressed weight data for the artificial neural network using an image decompression scheme. For example, a neural network processor (e.g. of a data centre) may be used to perform compression and/or decompression of weight values, e.g. whilst training an artificial neural network, but a graphics or image processor (e.g. of a portable device) may be used to perform decompression of (e.g. previously trained) weight values for application in an artificial neural network.

The Applicants have further identified that image compression schemes, and in particular graphics texture compression schemes, often allow random access to the data elements of the array that is compressed. This can, for example, allow selected elements of the array to be accessed and then processed separately from other elements of the array, but without the need to decompress and/or recompress the entire array.

Thus, in embodiments, the compression scheme may allow selected decompressed weight values to be derived from the compressed weight data without decompressing all of the compressed weight data. These embodiments can allow selected decompressed weight values to be accessed and/or processed separately from other weight values of the array. These embodiments can therefore significantly reduce the amount of processing resources needed, for example when it is desired to apply or process only selected decompressed weight values in the artificial neural network. In these embodiments, the compression scheme may not be an image compression scheme per se.

Thus, another embodiment of the technology described herein comprises a method of processing a set of weight values for an artificial neural network, the method comprising: representing a set of weight values for an artificial neural network in the form of an array of weight values; and using a compression scheme to compress the array of weight values to provide compressed weight data for the artificial neural network, wherein the compression scheme allows selected decompressed weight values to be derived from the compressed weight data without decompressing all of the compressed weight data.

Similarly, another embodiment of the technology described herein comprises a data processing apparatus for processing a set of weight values for an artificial neural network, the data processing apparatus comprising processing circuitry configured to: represent a set of weight values for an artificial neural network in the form of an array of weight values; and use a compression scheme to compress the array of weight values to provide compressed weight data for the artificial neural network, wherein the compression scheme allows selected decompressed weight values to be derived from the compressed weight data without decompressing all of the compressed weight data.

These embodiments may include one or more or all of the optional features described herein as appropriate. For example, as discussed above, a graphics processor or image processor may be used to compress the array of weight values using the compression scheme to provide the compressed weight data for the artificial neural network. Alternatively, as discussed above, a different processor (such as a neural network processor) may be used to compress the array of weight values using the compression scheme to provide the compressed weight data for the artificial neural network.

In embodiments, the compression scheme may allow random access to the selected weight values of the array of weight values that is compressed. In embodiments, the compression scheme may comprise a substantially parallel (or substantially non-sequential) compression scheme that can compress weight values substantially in parallel (or substantially non-sequentially). Similarly, in embodiments, the decompression scheme may allow random access to selected weight values of the array of weight values that is compressed. In embodiments, the decompression scheme may comprise a substantially parallel (or substantially non-sequential) decompression scheme that can decompress weight values substantially in parallel (or substantially non-sequentially).

In embodiments, the compression scheme (and decompression scheme) may be block-based. In these embodiments, using the compression scheme to compress the array of weight values may comprise dividing the array of weight values into plural blocks of weight values, and then compressing the plural blocks of weight values separately using the compression scheme. The selected weight values that can be decompressed may then be the weight values of one or more such blocks.

In embodiments, a block of weight values can be any desired and suitable size/shape in terms of weight values, such as rectangular (including square). The blocks of weight values may be non-overlapping. The compressed blocks may be the same or may differ in respect of size/shape (e.g. in terms of weight values). The compressed blocks may be the same or may differ in respect of compressed data bit rate (e.g. bits per compressed weight value). However, the compressed blocks may have the same (fixed) data size (e.g. in terms of bits or bytes). For example, a larger block (e.g. in terms of weight values) may have a lower bit rate (e.g. bits per compressed weight value), and vice versa. The array of weight values can be any desired and suitable size, shape or configuration in terms of such blocks.

The Applicants have further recognised that the weight values for an artificial neural network may comprise some weight values that are more error tolerant and other weight values that are less error tolerant. The weight values for an artificial neural network may also or instead comprise relatively more lower (e.g. zero or substantially zero) values surrounded by relatively fewer higher values, or vice versa. The Applicants have further recognised that image compression schemes, and in particular graphics texture compression schemes, often allow an array of data elements to be partitioned into distinct subsets (or "partitions") of elements, which can then be compressed with different sets of compression parameters for the respective subsets of elements.

Thus, in embodiments, using the compression scheme to compress the array of weight values may comprise partitioning the set of weight values into distinct subsets (or "partitions") of weight values. These embodiments may then comprise using different sets of compression parameters for the respective subsets of weight values. These embodiments can allow the compression parameters that are used to compress and/or decompress a subset of weight values to be tailored for that subset of weight values. In these embodiments, the compression scheme may not be an image compression scheme per se.

Thus, another embodiment of the technology described herein comprises a method of processing a set of weight values for an artificial neural network, the method comprising: representing a set of weight values for an artificial neural network in the form of an array of weight values; and using a compression scheme to compress the array of weight values to provide compressed weight data for the artificial neural network, wherein using the compression scheme to compress the array of weight values comprises partitioning the set of weight values into distinct subsets of weight values and using different sets of compression parameters for the respective subsets of weight values.

Similarly, another embodiment of the technology described herein comprises a data processing apparatus for processing a set of weight values for an artificial neural network, the data processing apparatus comprising processing circuitry configured to: represent a set of weight values for an artificial neural network in the form of an array of weight values; and use a compression scheme to compress the array of weight values to provide compressed weight data for the artificial neural network, wherein the processing circuitry is configured to, when using the compression scheme to compress the array of weight values, partition the set of weight values into distinct subsets of weight values and use different sets of compression parameters for the respective subsets of weight values.

These embodiments may include one or more or all of the optional features described herein as appropriate. For example, as discussed above, a graphics processor or image processor may be used to compress the array of weight values using the compression scheme to provide the compressed weight data for the artificial neural network. Alternatively, as discussed above, a different processor (such as a neural network processor) may be used to compress the array of weight values using the compression scheme to provide the compressed weight data for the artificial neural network. For another example, as discussed above, the compression scheme may allow selected decompressed weight values to be derived from the compressed weight data without decompressing all of the compressed weight data.

In embodiments, the different sets of compression parameters for the respective subsets of weight values may differ in respect of interpolation mode (the interpolation technique used to interpolate to the weight values of the subset) and/or the interpolation endpoint values (the endpoints used to interpolate to the weight values of the subset).

As discussed above, the compression scheme may be block-based. A subset of the weight values may comprise weight values for one or more blocks of weight values. For example, a block may be partitioned into regions, with a region of the block being associated with (e.g. comprising) a subset of weight values. Thus, in embodiments, a subset of weight values may comprise weight values from one or more blocks of weight values and/or a block may comprise weight values for one or more subsets.

The Applicants have also identified that image compression schemes, and in particular graphics texture compression schemes, often generate metadata for the array of data elements being compressed. As will be discussed in more detail below, the Applicants have identified that such metadata can have a number of beneficial uses in the context of artificial neural networks. Thus, in embodiments, using the compression scheme to compress the array of weight values may comprise generating metadata for one or more subsets (e.g. partitions or blocks) of the set of weight values. In these embodiments, the compression scheme may not be an image compression scheme per se.

Thus, another embodiment of the technology described herein comprises a method of processing a set of weight values for an artificial neural network, the method comprising: representing a set of weight values for an artificial neural network in the form of an array of weight values; and using a compression scheme to compress the array of weight values to provide compressed weight data for the artificial neural network, wherein using the compression scheme to compress the array of weight values comprises generating metadata for one or more subsets of the set of weight values.

Similarly, another embodiment of the technology described herein comprises a data processing apparatus for processing a set of weight values for an artificial neural network, the data processing apparatus comprising processing circuitry configured to: represent a set of weight values for an artificial neural network in the form of an array of weight values; and use a compression scheme to compress the array of weight values to provide compressed weight data for the artificial neural network, wherein the processing circuitry is configured to, when using the compression scheme to compress the array of weight values, generate metadata for one or more subsets of the set of weight values.

These embodiments may include one or more or all of the optional features described herein as appropriate. For example, as discussed above, a graphics processor or image processor may be used to compress the array of weight values using the compression scheme to provide the compressed weight data for the artificial neural network. Alternatively, as discussed above, a different processor (such as a neural network processor) may be used to compress the array of weight values using the compression scheme to provide the compressed weight data for the artificial neural network. For another example, the compression scheme may allow selected decompressed weight values to be derived from the compressed weight data without decompressing all of the compressed weight data. For another example, using the compression scheme to compress the array of weight values may comprise partitioning the set of weight values into distinct subsets of weight values. These embodiments may comprise using different sets of compression parameters for the respective subsets of weight values.

The metadata for the one or more subsets of the set of weight values can be generated in any desired and suitable way. The metadata for a subset of the set of weight values may be based on and/or may indicate any desired and suitable property of the subset of weight values. For example, the metadata for a subset of the set of weight values may be based on and/or may indicate a characteristic weight value that is characteristic of the subset of weight values (such as zero, an average value, or a "DC component" value). In some embodiments, the metadata may be generated by assigning a particular (e.g. subset or partition) identifier to the subset of weight values. In some embodiments, the metadata may be generated by applying a transformation to the subset of weight values in question (such as a discrete cosine transform (DCT)).

The metadata for a subset of the set of weight values can take any desired and suitable form, for example that is based on and/or that indicates the property of the subset of weight values. For example, the metadata may comprise a characteristic weight value that is characteristic of the subset of weight values in question (such as zero, an average value, or a "DC component" value) or may comprise a particular (e.g. subset or partition) identifier for the subset of weight values. The metadata for the one or more subsets may be provided as a set or an array of metadata elements that correspond (e.g. in terms of position in the set or array) to the respective subsets of weight values. This can allow the metadata for a particular weight value or subset of weight values comprising a particular weight value to be indexed using the array position for the particular weight value.

Embodiments may further comprise providing (e.g. determining) one or more "key" values for the set of weight values. A key value may comprise a selected weight value (such as zero) or a selected (e.g. partition) identifier for one or more subsets of weight values (e.g. that are zero or substantially zero) that are to be processed in a particular manner. As will be discussed in more detail below, the one or more key values may indicate the particular manner in which to apply the weight values of the one or more subsets in the artificial neural network. Embodiments may comprise storing the one or more key values for the array of weight values for use when implementing the artificial neural network.

In embodiments, the compression scheme can take any desired and suitable form. As will be appreciated, in some embodiments the compression scheme may be an image compression scheme, whilst in other embodiments the compression scheme may at least have properties of an image compression scheme.

In embodiments, the compression scheme may comprise JPEG compression. Using the compression scheme to compress the array of weight values may comprise applying a transformation (such as a discrete cosine transform (DCT)) to (a or each block of) the array of weight values to generate coefficients. As indicated above, the metadata for the weight values may comprise the "DC component" coefficient provided by this transformation. Using the compression scheme to compress the array of weight values may comprise quantisation of the coefficients to generate quantised coefficients. Using the compression scheme to compress the array of weight values may comprise (entropy (e.g. zigzag)) encoding of the (quantised) coefficients to generate encoded (quantised) coefficients. Thus, in embodiments, the compressed weight data may comprise encoded (quantised) coefficients.

In embodiments, the compression scheme may comprise, or may at least have properties of, a graphics texture compression scheme. In embodiments, the compression scheme may comprise S3 texture compression (S3TC) or adaptive scalable texture compression (ASTC). ASTC is described, for example, in US 2012/0281007, US 2015/0235384, US 2012/0281006, US 2012/0281005, US 2015/0228050 and US 2012/0281925, the entire contents of which are incorporated herein by reference. Using the compression scheme to compress the array of weight values may comprise determining a base value from which to interpolate to a weight value of (a or each block of) the array and/or determining (e.g. a pair of) endpoints for interpolating to a weight value of (a or each block of) the array. Thus, in embodiments, the compressed weight data may comprise base values and/or (e.g. pairs of) endpoints.

In embodiments, the compression scheme may be lossless or at least substantially lossless. However, as will be discussed in more detail below, the Applicants have recognised that even lossy compression schemes may be used since the artificial neural network may be trained to compensate for errors introduced by a lossy compression scheme. Thus, in embodiments, the compression scheme may be a lossy compression scheme.

In embodiments, the compressed weight data for the artificial neural network can be used in any desired and suitable way. Embodiments may, for example, comprise writing out the compressed weight data for the artificial neural network to storage. Similarly, embodiments may comprise reading in at least some of the compressed weight data for the artificial neural network from storage. As discussed above, compressing the set of weight values for the artificial neural network can significantly reduce the amount of bandwidth and/or storage used in these embodiments.

Embodiments may also or instead comprise using a decompression scheme, such as an image decompression scheme, to derive decompressed weight values from the compressed weight data for the artificial neural network.

As discussed above, in embodiments, the artificial neural network may be trained, for example to compensate for the effects of a lossy compression scheme. Thus, embodiments may comprise training the artificial neural network using the decompressed weight values to provide a set of trained weight values for the artificial neural network.

The training may comprise any desired and suitable training process. Embodiments may, for example, comprise modifying the decompressed weight values, e.g. to try to reduce or minimise an error metric, thereby providing a set of trained weight values for the artificial neural network. The error metric may be based on a comparison between a target result and a result generated using the artificial neural network. The training may comprise one or more iterations of a training process in which decompressed weight values are modified. The training may, for example, comprise one or more iterations of a training process in which an array of weight values is compressed using the compression scheme and then decompressed using the decompression scheme.

In embodiments in which using the compression scheme to compress the array of weight values comprises partitioning the set of weight values into distinct subsets of weight values, the same or different partitioning may be used in one or more iterations of the training process. Preserving the same partitioning can facilitate the training process by allowing the compression/decompression scheme to be linear and thus able to be differentiated for back-propagation.

In embodiments in which using the compression scheme to compress the array of weight values comprises determining endpoint values for interpolating to weight values, the endpoints may also be trained when training the weight values.

The set of trained weight values may be used in any desired and suitable way. Embodiments may, for example, comprise representing the set of trained weight values for the artificial neural network in the form of an array of trained weight values. Embodiments may then comprise using the compression scheme to compress the array of trained weight values to provide compressed trained weight data for the artificial neural network, for example as discussed above.

The compressed trained weight data for the artificial neural network can be used in any desired and suitable way, for example as describe above in relation to the compressed weight data for the artificial neural network. Embodiments may, for example, comprise writing out the compressed trained weight data for the artificial neural network to storage. Similarly, embodiments may comprise reading in at least some of the compressed trained weight data for the artificial neural network from storage. Embodiments may comprise using the decompression scheme to derive decompressed trained weight values from the compressed weight data for the artificial neural network, and applying the decompressed trained weight values when producing a result from an input to the artificial neural network.

Thus, embodiments may comprise using a decompression scheme, such as an image decompression scheme, to derive decompressed weight values from the compressed weight data for the artificial neural network. Embodiments may then comprise applying the decompressed weight values when producing a result from an input to the artificial neural network.

Thus, another embodiment of the technology described herein comprises a method of processing a set of weight values for an artificial neural network, the method comprising:

using a decompression scheme to derive decompressed weight values from compressed weight data for an artificial neural network; and applying the decompressed weight values when producing a result from an input to the artificial neural network.

Similarly, another embodiment of the technology described herein comprises a data processing apparatus for processing a set of weight values for an artificial neural network, the data processing apparatus comprising processing circuitry configured to:

use an image decompression scheme to derive decompressed weight values from compressed weight data for an artificial neural network; and apply the decompressed weight values when producing a result from an input to the artificial neural network.

These embodiments may include one or more or all of the optional features described herein as appropriate. For example, as discussed above, a graphics processor or image processor may be used to derive the decompressed weight values from the compressed weight data for the artificial neural network using the decompression scheme. Alternatively, as discussed above, a different processor (such as a neural network processor) may be used to derive the decompressed weight values from the compressed weight data for the artificial neural network using the decompression scheme.

The decompression scheme can take any desired and suitable form that corresponds to (e.g. is the inverse of) the compression scheme, as discussed above. For example, the decompression scheme may allow selected decompressed weight values to be derived from the compressed weight data without decompressing all of the compressed weight data. For another example, the decompression scheme may be block-based. In these embodiments, using the decompression scheme to derive the decompressed weight values may comprise decompressing weight values for one or more blocks separately and/or in parallel using the decompression scheme. For another example, using the image decompression scheme to derive the decompressed weight values from the compressed weight data may comprise using different sets of compression parameters for deriving respective subsets (partitions) of decompressed weight values.

Applying the decompressed weight values when producing the result from the input to the artificial neural network can be performed in any desired and suitable way. For example, a sequence of instructions (e.g. a thread) may be used to apply a decompressed weight value. In these embodiments, applying a decompressed weight value may comprise generating and/or executing a sequence of instructions (e.g. a thread) for applying the decompressed weight value. For example, a graphics processor or image processor may be used to generate and/or execute a sequence of instructions (e.g. a thread) for applying the decompressed weight value. Alternatively, a different processor (such as a neural network processor) may be used to generate and/or execute a sequence of instructions (e.g. a thread) for applying the decompressed weight value.

In embodiments, the metadata for one or more subsets of a set of weight values, if generated when using a compression scheme to compress an array of weight values, can be used in any desired and suitable way. Embodiments may, for example, comprise writing out the metadata for the one or more subsets of the set of weight values to storage. Similarly, embodiments may comprise reading the metadata for one or more subsets of the set of weight values from storage.

Embodiments may also or instead comprise determining a particular manner in which to apply weight values based on metadata generated for one or more subsets of the set of weight values. Embodiments may then comprise applying the decompressed weight values in accordance with the determined particular manner when producing a result from an input to the artificial neural network. These embodiments can, for example, be used to improve the processing efficiency or performance of the artificial neural network when producing a result from an input to the artificial neural network. In these embodiments, the compression scheme may not be an image compression scheme per se.

Thus, another embodiment of the technology described herein comprises a method of processing a set of weight values for an artificial neural network, the method comprising: using a decompression scheme to derive decompressed weight values from compressed weight data for an artificial neural network; and applying the decompressed weight values when producing a result from an input to the artificial neural network; wherein the method further comprises: determining a particular manner in which to apply weight values based on metadata generated for one or more subsets of a set of weight values; and applying the decompressed weight values in accordance with the determined particular manner when producing a result from an input to the artificial neural network.

Similarly, another embodiment of the technology described herein comprises a data processing apparatus for processing a set of weight values for an artificial neural network, the data processing apparatus comprising processing circuitry configured to: use a decompression scheme to derive decompressed weight values from compressed weight data for an artificial neural network; and apply the decompressed weight values when producing a result from an input to the artificial neural network; wherein the processing circuitry is further configured to: determine a particular manner in which to apply weight values based on metadata generated for one or more subsets of a set of weight values; and apply the decompressed weight values in accordance with the determined particular manner when producing a result from an input to the artificial neural network.

These embodiments may include one or more or all of the optional features described herein as appropriate. For example, as discussed above, a graphics processor or image processor may be used to derive the decompressed weight values from the compressed weight data for the artificial neural network using the decompression scheme. Alternatively, as discussed above, a different processor (such as a neural network processor) may be used to derive the decompressed weight values from the compressed weight data for the artificial neural network using the decompression scheme.

Determining the particular manner in which to apply the weight values based on the metadata can be performed in any desired and suitable way. As discussed above, one or more "key" values may be provided that indicate a particular manner in which to apply the weight values. In these embodiments, determining the particular manner in which to apply the weight values may comprise comparing the metadata for a subset of weight values to one or more key values for the array of weight values.

The particular manner in which to apply the weight values can take any desired and suitable form. In embodiments, the particular manner may comprise applying a subset of decompressed weight values in an enhanced manner (e.g. a subset of decompressed weight values may be scaled to produce a subset of higher weight values, which are then applied when producing a result from an input to the artificial neural network) based on the metadata. Conversely, the particular manner may comprise applying a subset of decompressed weight values in a suppressed manner (e.g. a subset of decompressed weight values may be scaled to produce a subset of lower weight values, which are then applied when producing a result from an input to the artificial neural network) based on the metadata. These embodiments can be used to enhance or suppress certain subsets of weight values, for example so as to improve the performance of the artificial neural network.

In embodiments, the particular manner may also or instead comprise not applying a subset of weight values based on the metadata. For example, these embodiments may comprise determining whether or not to apply a subset of weight values based on metadata generated for the subset of weight values. When it is determined to apply a subset of weight values, these embodiments may comprise applying the subset of weight values when producing a result from an input to the artificial neural network. For example, it may be determined to apply a subset of weight values that have a particular characteristic value (e.g. greater than a key value, such as zero, or substantially greater than a key value, such as zero), e.g. as indicated by the metadata for the subset of weight values. Applying a subset of weight values may comprise generating and/or executing sequences of instructions (e.g. threads) for applying the subset of weight values. Embodiments may also comprise, prior to applying the subset of weight values, using the decompression scheme to derive the subset of weight values from the compressed weight data for the artificial neural network.

Conversely, when it is determined not to apply a subset of weight values, these embodiments may comprise not applying the subset of weight values when producing a result from an input to the artificial neural network. For example, it may be determined not to apply a subset of weight values that have a particular characteristic value (e.g. a key value, such as zero or substantially zero), e.g. as indicated by the metadata for the subset of weight values. Not applying a subset of weight values may comprise not generating and/or not executing sequences of instructions (e.g. threads) for applying the subset of weight values. Embodiments may also comprise, not using the decompression scheme to derive the subset of weight values from the compressed weight data for the artificial neural network.

These embodiments can significantly reduce the amount of processing resources needed when producing a result from an input to the artificial neural network, for example by reducing the number of weight values that are used when implementing the artificial neural network (e.g. when it is determined not to apply and/or decompress one or more subsets of the set).

In embodiments, the artificial neural network may take any desired and suitable form. The artificial neural network may, for example, comprise an input layer that receives an input, one or more intermediate layers, and an output layer that provides a result. The one or more intermediate layers may comprise one or more activation layers (e.g. that apply one or more activation functions). Weight values may be applied at one or more layers when producing a result from an input to the artificial neural network. Weight values may be applied at a set of interconnections between one or more pairs of layers when producing a result from an input to the artificial neural network. Weight values may be applied to respective values provided on the input side of a set of interconnections to produce a set of weighted values on the output side of the set of interconnections. A set of values may be provided as inputs to a set of activation functions at an activation layer or may be used to generate a result at the output layer.

In embodiments, the artificial neural network may comprise a convolutional neural network, for example having one or more convolutional layers (e.g. that apply one or more convolution operations), one or more pooling layers (e.g. that pool or aggregate sets of input values to generate an output), and/or one or more fully connected layers (e.g. comprising one or more activation layers). Weight values may be applied at one or more convolutional layers when producing a result from an input to the artificial neural network.

In embodiments, the set of weight values may be any desired and suitable set of weight values for the artificial neural network. The set of weight values may, for example, comprise some or all of the weight values for the artificial neural network. The set of weight values may, for example, comprise some or all of the weight values applied at one or more layers and/or between one or more pairs of layers of the artificial neural network.

In embodiments, the array of weight values may take any desired and suitable form. The array of weight values can be any desired and suitable size/shape in terms of weight values, but may be rectangular (including square). Where the set of weight values does not comprise a suitable (e.g. rectangular) number of weight values, the array of weight values may be padded with values (e.g. zero or a key value) so as to comprise a suitable (e.g. rectangular) number of weight values.

In embodiments, the artificial neural network may be used for any desired and suitable purpose, for example a classification or inference task such as image recognition, sound (speech) recognition, text analysis, anomaly detection, etc. Thus, the input to the artificial neural network may represent an image, sound, text, signal, etc. In some embodiments, the input may be represented as a set or array of data values, such as a set or array of graphics or image data values (luminance and/or colour values). The result may indicate whether or not a particular feature (e.g. person, animal, object, word, letter, number, anomaly, etc.) is deemed to be present in the input. The input may be received, generated or recorded by the device that comprises the data processing apparatus or by another device, e.g. using a camera, microphone, sensor, etc., of the device in question.

As will be appreciated, any of the above described processes that are performed in respect of a set of weight values for an artificial neural network may, in practice, be performed respectively for each (e.g. every) one of plural sets of weight values for the artificial neural network. Similarly, any of the above described processes that are performed in respect of a subset (e.g. partition or block) of weight values of a set of weight values may, in practice, be performed respectively for each (e.g. every) one of plural subsets of weight values of the set of weight values.

The processing described herein in any embodiment may be performed by any desired and suitable data processing apparatus and/or part thereof. For example, as discussed above, at least some of the processing described herein (such as compressing, decompressing and/or applying the weight values, e.g. for training) may be performed by a neural network processor. The data processing apparatus may therefore comprise or may be a neural network processor. Thus, the processing circuitry may form part of a neural network processor. As is also discussed above, at least some of the processing described herein (such as decompressing and/or applying the weight values, e.g. to perform a classification or inference task) may be performed by a graphics processor or image processor. The data processing apparatus may therefore comprise or may be a graphics processor or image processor. Thus, the processing circuitry may form part of a graphics processor or image processor. The data processing apparatus may comprise, or may be, or may form part of, a system on chip (SoC). In an embodiment, the various functions of the technology described herein are carried out on a single data processing platform.

As will be appreciated by those skilled in the art, the data processing apparatus may be part of an overall data processing system that includes, for example, a host (e.g. central) processor, memory, etc. The host processor may, for example, execute applications that require data processing by the data processing apparatus. The host processor may send appropriate commands and data to the data processing apparatus to control it to perform data processing and to generate and/or use a result required by applications executing on the host processor. To facilitate this, the host processor may execute a driver for the data processing apparatus and/or may execute a compiler or compilers for compiling programs to be executed by a programmable execution unit of the data processing apparatus.

In embodiments, the apparatus may comprise a memory (storage) controller configured to read in and/or write back the compressed weight data from and/or to memory (storage). The memory may be any desired and suitable memory of or for the data processing apparatus. The memory may be external to the one or more processors of or for the data processing apparatus, such as a graphics processor, image processor and/or neural network processor. The memory may be external to the data processing apparatus. The memory may be, for example, main system memory.

In embodiments, the apparatus or system may comprise, and/or may be in communication with, one or more memories and/or memory devices that store the data described herein, and/or store software for performing the processes described herein. The apparatus or system may comprise, and/or may be in communication with, a camera for recording an input in the form of an image. The apparatus or system may comprise, and/or may be in communication with, a microphone for recording an input in the form of a sound. The apparatus or system may comprise, and/or may be in communication with, a sensor for recording an input in the form of a signal. The apparatus or system may comprise, and/or may be in communication with a display for displaying a result based on the data processing.

The technology described herein can be implemented in any suitable apparatus or system, such as a suitably configured computer or micro-processor based apparatus or system. In an embodiment, the technology described herein is implemented in a computer and/or micro-processor based apparatus or system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the apparatus or system can otherwise include any one or more or all of the usual functional units, etc., that data processing apparatus or systems include.

The various data processing stages can be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus, data processor, renderer or microprocessor system comprising a data processor causes in conjunction with said data processor said apparatus, processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As is discussed above, embodiments of the technology described herein relate to arrangements in which weight values for an artificial neural network are compressed using a compression scheme that has the properties of an image compression scheme. Using an image compression scheme to compress weight values can provide for efficient storage and processing of the weight values for an artificial neural network.

Various embodiments of the technology described herein will now be described with reference to a data processing system that uses a graphics processor to perform compression and decompression of weight values for an artificial neural network. However, the concepts described herein can equally be applied to arrangements in which other types of data processor, such as an image processor, or a neural network processor, are used to perform the compression and/or decompression of the weight values for the artificial neural network. For example, as discussed above, a dedicated neural network processor of a data centre can be used to perform compression and decompression of weight values whilst training an artificial neural network, and the graphics processor or image processor can later be used to perform decompression of the trained weight values provided by the data centre for application in the artificial neural network.

FIG. 1 shows schematically an embodiment of a data processing system 100 that can compress and decompress weight data for an artificial neural network in the manner of the technology described herein.

In this embodiment, the system 100 comprises a data processing apparatus in the form of a system on chip (SoC) 102. The system 100 also comprises off-chip (main) memory 114, a display device 116, and a camera 118. The SoC 102 comprises a central processing unit (CPU) 104, a graphics processing unit (GPU) 106, a display controller 108, an interconnect 110 and a memory controller 112.

As is shown in FIG. 1, the CPU 104, GPU 106, and display controller 108 communicate with each other via the interconnect 110 and with the memory 114 via the interconnect 110 and memory controller 112. The SOC 102 also communicates with the display device 116 via the display controller 108 and with the camera 118 via the interconnect 110.

The GPU 106, under the control of the CPU 104, can generate rendered outputs for display and store the rendered outputs in the memory 114. The display controller 108 can read in rendered outputs stored in the memory 114, and use the rendered outputs to generate output frames for display on the display device 116.

In the following embodiments, the GPU 106 also implements an artificial neural network in order to perform image recognition using an image provided by the camera 118. The result of the image recognition can be provided as part of output frame displayed on the display device 116. The result can, however, be used in other ways. For example, the result may be used in training the weights of the artificial neural network or may cause a particular action to be taken by the data processing system 100.

Other arrangements for the data processing system 100 would, of course, be possible. For example, a processor other than the GPU 106 may perform the compression and/or decompression, and/or may implement the artificial neural network. Similarly, the artificial neural network may be used for other purposes, such as speech recognition, text analysis, anomaly detection, etc.

Figure 2:
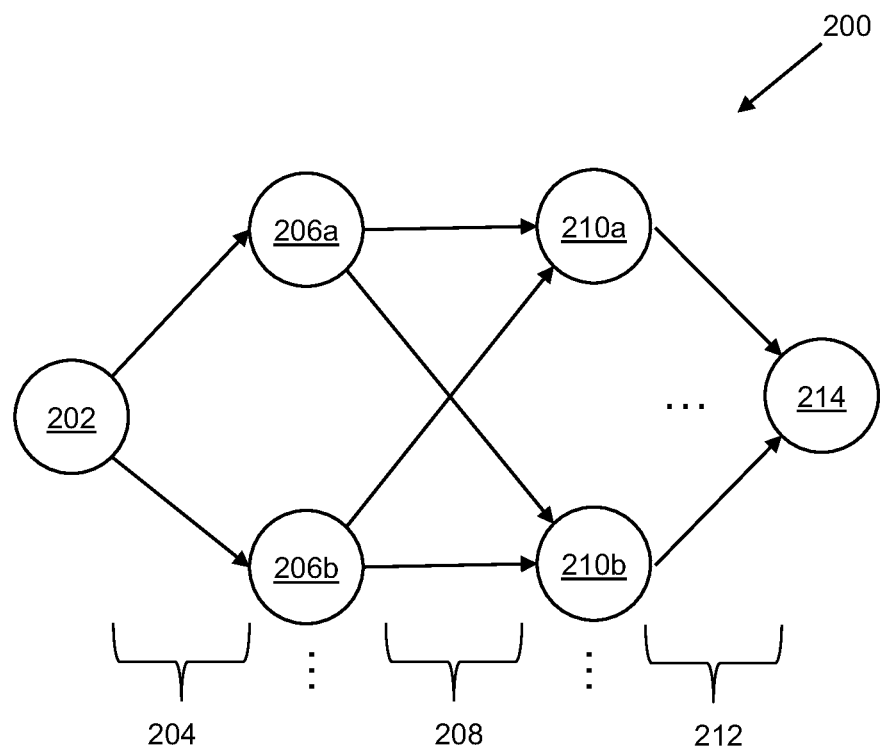
FIG. 2 shows schematically an artificial neural network that can be used in embodiments of the technology described herein.

An artificial neural network 200 that can be implemented in embodiments of the technology described herein is shown in FIG. 2.

As is shown in FIG. 2, the artificial neural network 200 comprises an input layer 202 that receives an input, such as an array of image data, a first set of activation layer nodes 206a, 206b, a second set of activation layer nodes 210a, 210b, and an output layer 214 that provides a result such as an indication of whether or not a particular feature is deemed by the artificial neural network 200 to be present in the in the input image data.

The artificial neural network 200 further comprises a first set of interconnections 204 between the input layer 202 and the first set of activation layer nodes 206a, 206b, a second set of interconnections 208 between the first set of activation layer nodes 206a, 206b and the second set of activation layer nodes 210a, 210b, and a third set of interconnections 212 between the second set of activation layer nodes 210a, 210b and the output layer 214.

In this embodiment, a weight value is applied to each value of an array of values provided on the input side of each interconnection to produce a weighted array of values on the output side of the interconnection. An activation function is also applied to the array of weighted values received on the input side of each activation layer node to produce an activated array of values on the output side of the activation layer node. A result is generated at the output layer 214 from the array of weighted values received on the input side of the output layer 214.

The artificial neural network 200 can comprise many more activation layers and many more activation layer nodes at each activation layer, and thus can comprise many more interconnections, than is shown in FIG. 2. The artificial neural network 200 can therefore comprise many more weight values than is suggested by FIG. 2.

Figure 3:
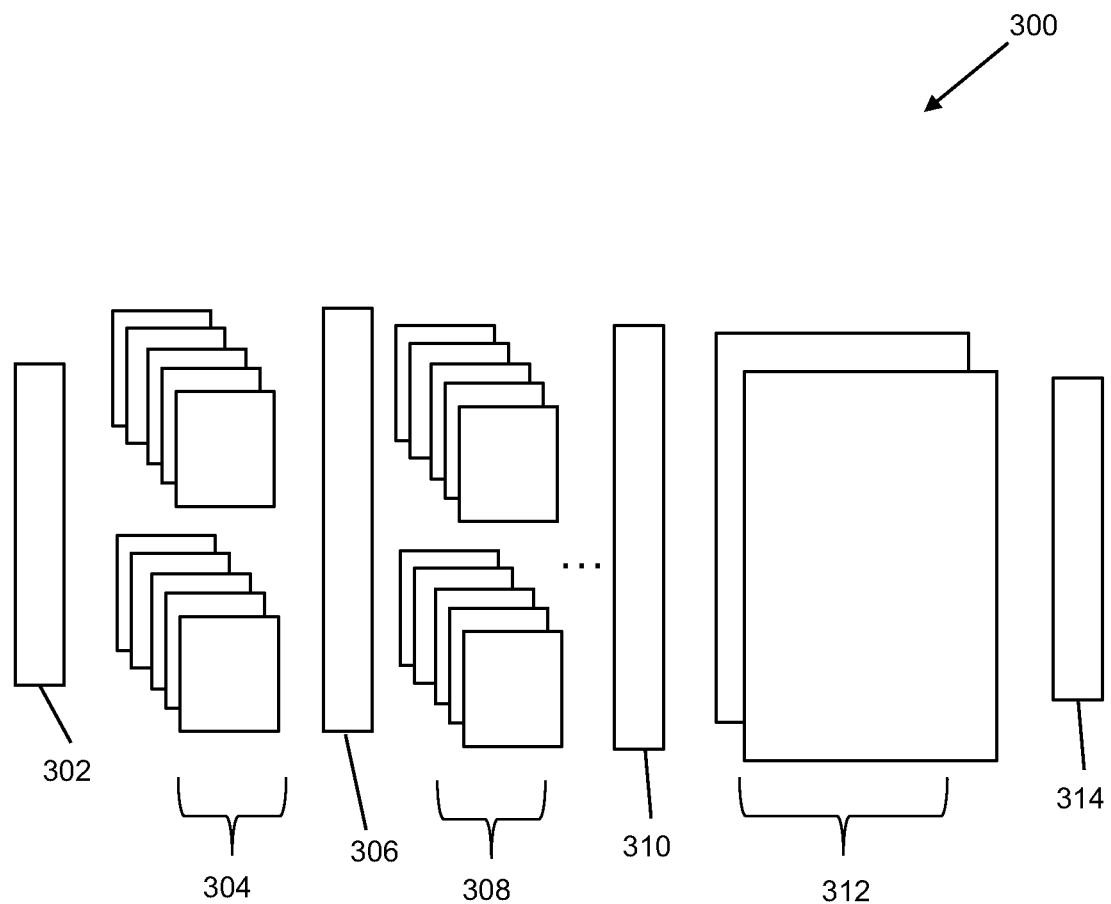
FIG. 3 shows schematically a convolutional artificial neural network that can be used in embodiments of the technology described herein.

An alternative artificial neural network that can be implemented in embodiments of the technology described herein is shown in FIG. 3. In this embodiment, the artificial neural network comprises a convolutional neural network 300.

As is shown in FIG. 3, the convolutional neural network 300 comprises an input layer 302 that receives an input, such as an array of image data, a first convolution layer 304, a first pooling layer 306, a second convolution layer 308, a second pooling layer 310, a fully connected layer 312 and an output layer 314 that provides a result, such as an indication of whether or not a particular feature is deemed by the convolutional neural network 300 to be present in the input image data.

In this embodiment, at each convolution layer, an array of weight values is repeatedly applied to respective regions of the input provided on the input side of the convolution layer to produce plural arrays of data on the output side of the convolution layer. At each pooling layer, the plural arrays of data are aggregated (e.g. a value, such as an average or maximum value, is generated from the values for corresponding positions in the plural arrays of data) to produce a pooled array of data on the output side of the pooling layer. In this embodiment, the fully connected layer 312 and output layer 314 operates in a similar manner to the activation layers and output layer of the artificial neural network 200 of FIG. 2.

In practice, the convolutional neural network 300 can comprise many more layers than is shown in FIG. 3. The fully connected layer 312 can also comprise many weight values. The convolutional neural network 300 can therefore comprise many more weight values than is suggested by FIG. 3.

In the artificial neural networks described above, the weight values represent a significant amount of data. The processing of this weight data will now be discussed in more detail with reference to the embodiments of FIGS. 4-10.

Figure 4:
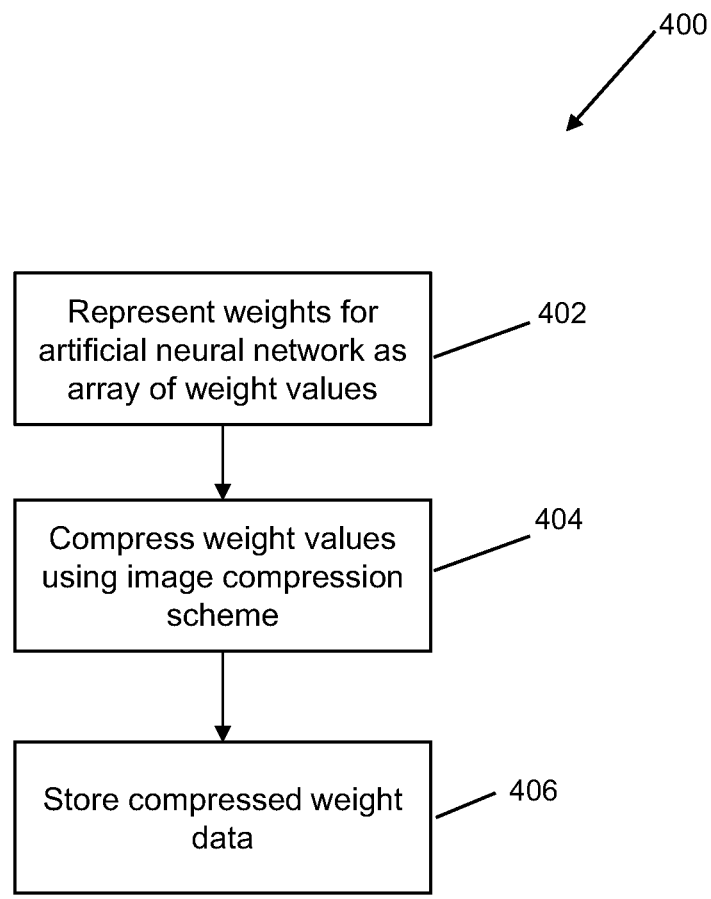
FIG. 4 shows a method of compressing weight values according to an embodiment of the technology described herein.

FIG. 4 shows a method 400 of compressing weight values according to an embodiment of the technology described herein. In step 402, a set of weight values for the artificial neural network is represented in the form of an array of weight values. Then, in step 404, the GPU 106 uses an image compression scheme to compress the array of weight values to provide compressed weight data for the artificial neural network. By way of example, two particular image compression schemes that can be used in step 404 are discussed in more detail below. Then, in step 406, the compressed weight data is written out by the GPU 106 for storage in the memory 114. Compressing the weight values using the image compression scheme can reduce the amount of bandwidth and storage needed when transferring and storing the weight values for use later use in the artificial neural network. For example, in some embodiments, the weight data can be reduced from around 600 Mb to less than 100 Mb.

In other embodiments, rather than the GPU 106, a dedicated neural network processor of a data centre may be used to perform the compression of the weight values for the artificial neural network. In these embodiments, the compressed weight data may be provided to the data processing system 100 by the data centre. The data processing system 100 may then decompress and apply the weight values in the artificial neural network, for example using the GPU 106.

Figure 5:
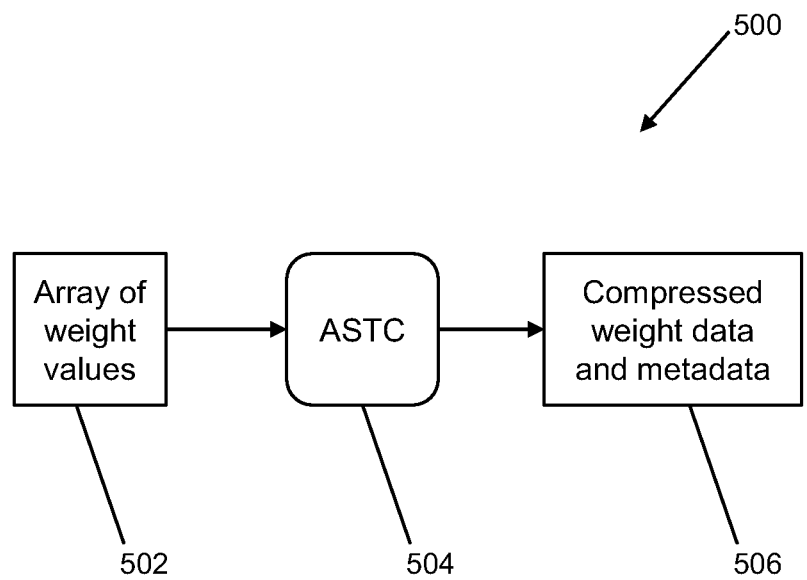
FIG. 5 shows a method of compressing weight values using adaptive scalable texture compression (ASTC) according to an embodiment of the technology described herein.

FIG. 5 shows a method 500 of compressing weight values according to an embodiment in which adaptive scalable texture compression (ASTC) is used as the image compression scheme. As discussed above, the set of weight values for the artificial neural network is represented in the form of an array of weight values 502. Then, ASTC 504 is performed to compress the array of weight values 502 to provide compressed weight data and metadata 506 from the array of weight values. ASTC is described, for example, in US 2012/0281007, US 2015/0235384, US 2012/0281006, US 2012/0281005, US 2015/0228050 and US 2012/0281925, the entire contents of which are incorporated herein by reference.

ASTC 504 comprises, inter alia, dividing the array of values into distinct blocks of values and compressing the blocks on a block-by-block basis. ASTC 504 also comprises, inter alia, partitioning the values into distinct subsets or "partitions" of values, and then using a different sets of compression parameters for the respective partitions. Each block can contain values from one or more partitions. The compression parameters that can be varied between partitions include interpolation mode and interpolation endpoint values. ASTC 504 also comprises, inter alia, determining a base value from which to interpolate to each value of the array and determining a pair of endpoints for interpolating to that value of the array.

Figure 6:
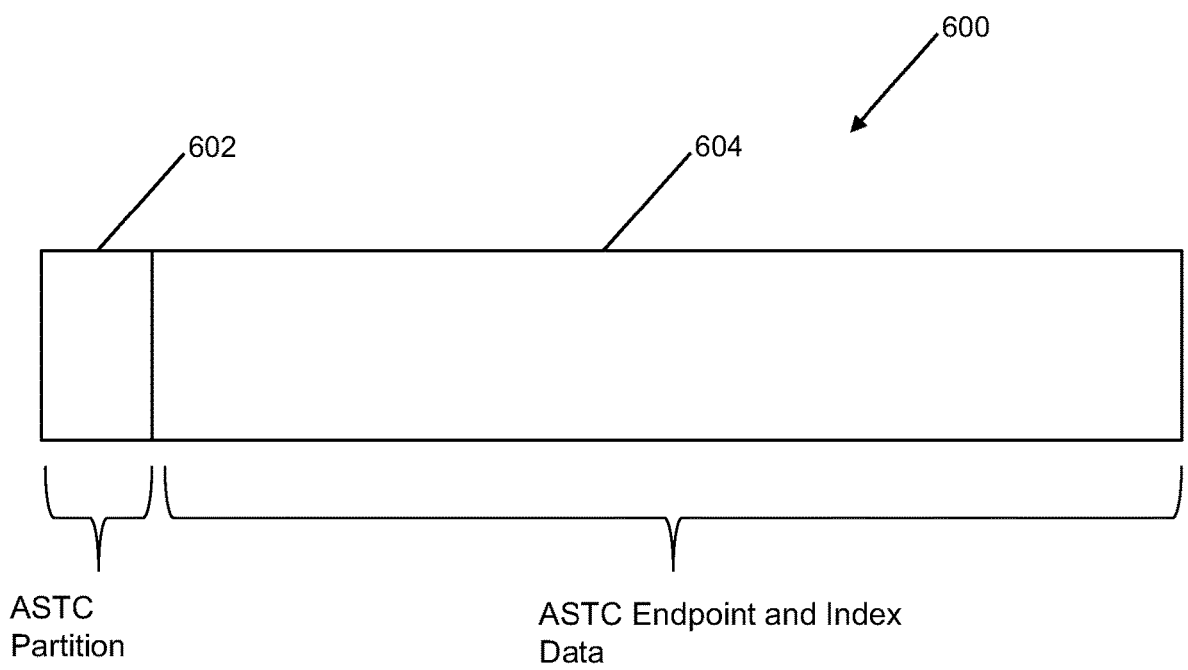
FIG. 6 shows data generated when compressing weight values using ASTC according to an embodiment of the technology described herein.

FIG. 6 shows data 600 generated for a partition when compressing weight values using ASTC 504. As is shown in FIG. 6, the data 600 for the partition comprises an ASTC Partition field 602 and an ASTC Endpoint and Index Data field 604. The ASTC Partition Data field 602 identifies the particular partition and the ASTC Endpoint and Index Data field 604 comprises endpoint values used for interpolation and indexes used to index the relevant pair of endpoints for interpolating a particular weight value when performing decompression of that particular weight value. The ASTC Partition field 602 for a particular partition constitutes metadata that can be used when decompressing and applying the weight values of that subset of weight values. The use of such metadata when decompressing and applying the weight values will be discussed in more detail below.

Figure 7:
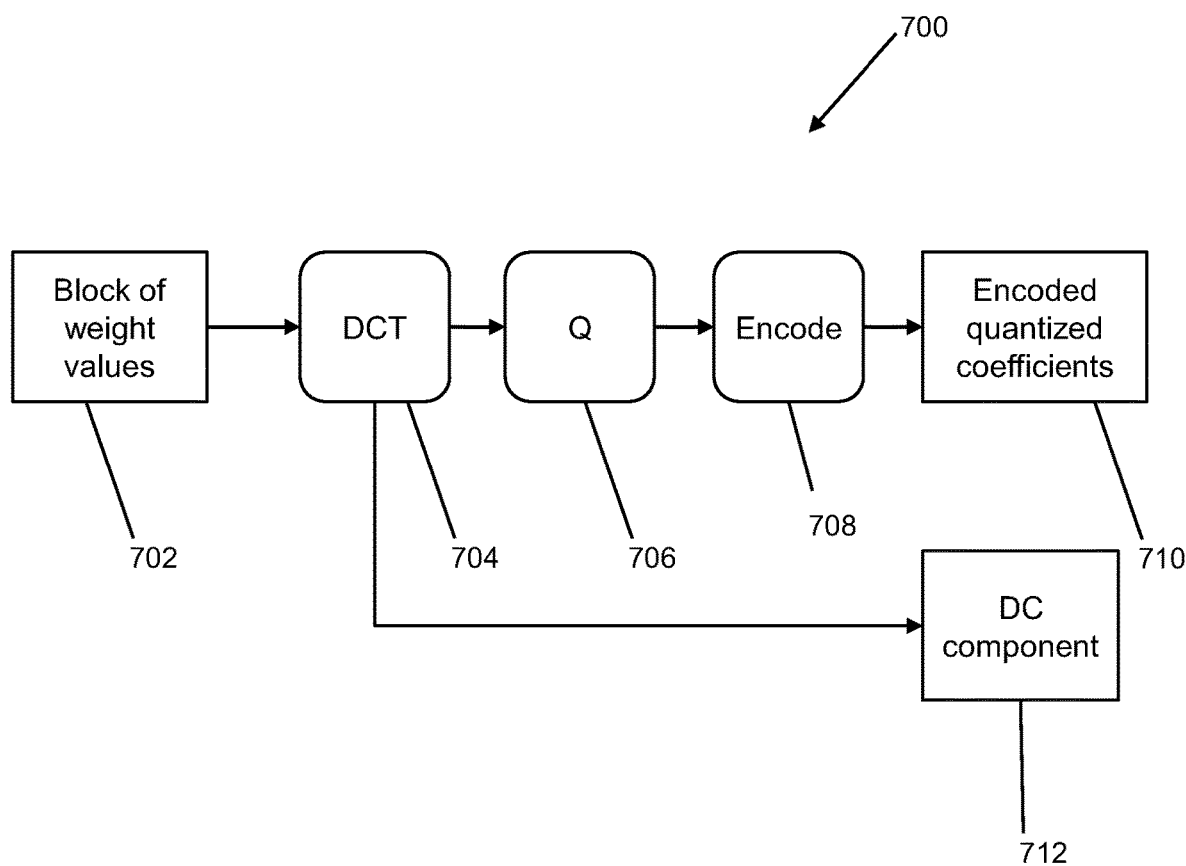
FIG. 7 shows a method of compressing weight values using JPEG compression according to an embodiment of the technology described herein.

FIG. 7 shows an alternative method 700 of compressing weight values using JPEG compression as the image compression scheme. As discussed above, the set of weight values for the artificial neural network is represented in the form of an array of weight values. In this case, the array of weight values is divided into blocks of 8×8 weight values 702 that are compressed on a block-by-block basis. Then, a discrete cosine transform (DCT) 704 is performed to generate a set of coefficients for a block. Then, quantisation (Q) 706 is performed to generate a set of quantised coefficients. Then, zigzag entropy encoding 708 is performed to generate compressed weight data in the form of a set of encoded quantised coefficients 710 for the block.

As part of the DCT 704, a DC component 712 for the block of weight values is generated. The DC component 712 constitutes metadata for a block that can be used when decompressing and applying the weight values of that subset of weight values. Again, the use of such metadata when decompressing and applying the weight values will be discussed in more detail below.

Figure 8:
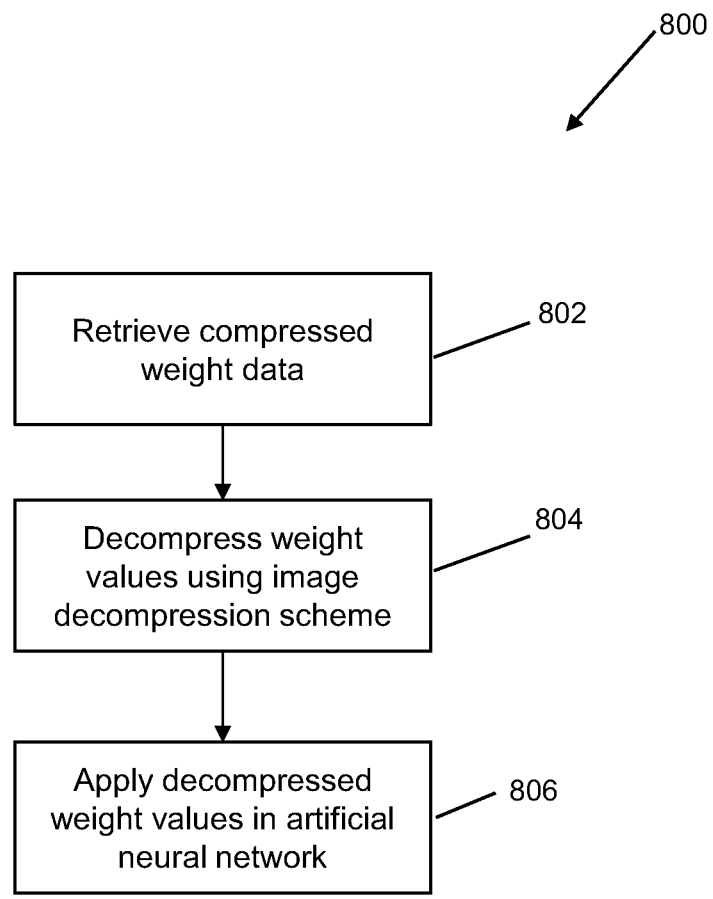
FIG. 8 shows a method of decompressing weight values according to an embodiment of the technology described herein.

FIG. 8 shows a method 800 of decompressing weight values. In step 802, compressed weight data is retrieved from the memory 114. Then, in step 804, the GPU 106 uses an image decompression scheme to decompress weight values for the artificial neural network. The image decompression is the inverse of an image compression scheme as discussed above. Then, in step 806, the decompressed weight values are applied in the artificial neural network.

Applying the weight values comprises the GPU 106 generating and then executing threads for applying the weight values.

In other embodiments, rather than the GPU 106, an image processor, or a dedicated neural network processor of a data centre, may be used to perform the decompression and/or application of the weight values for the artificial neural network.

Figure 9:
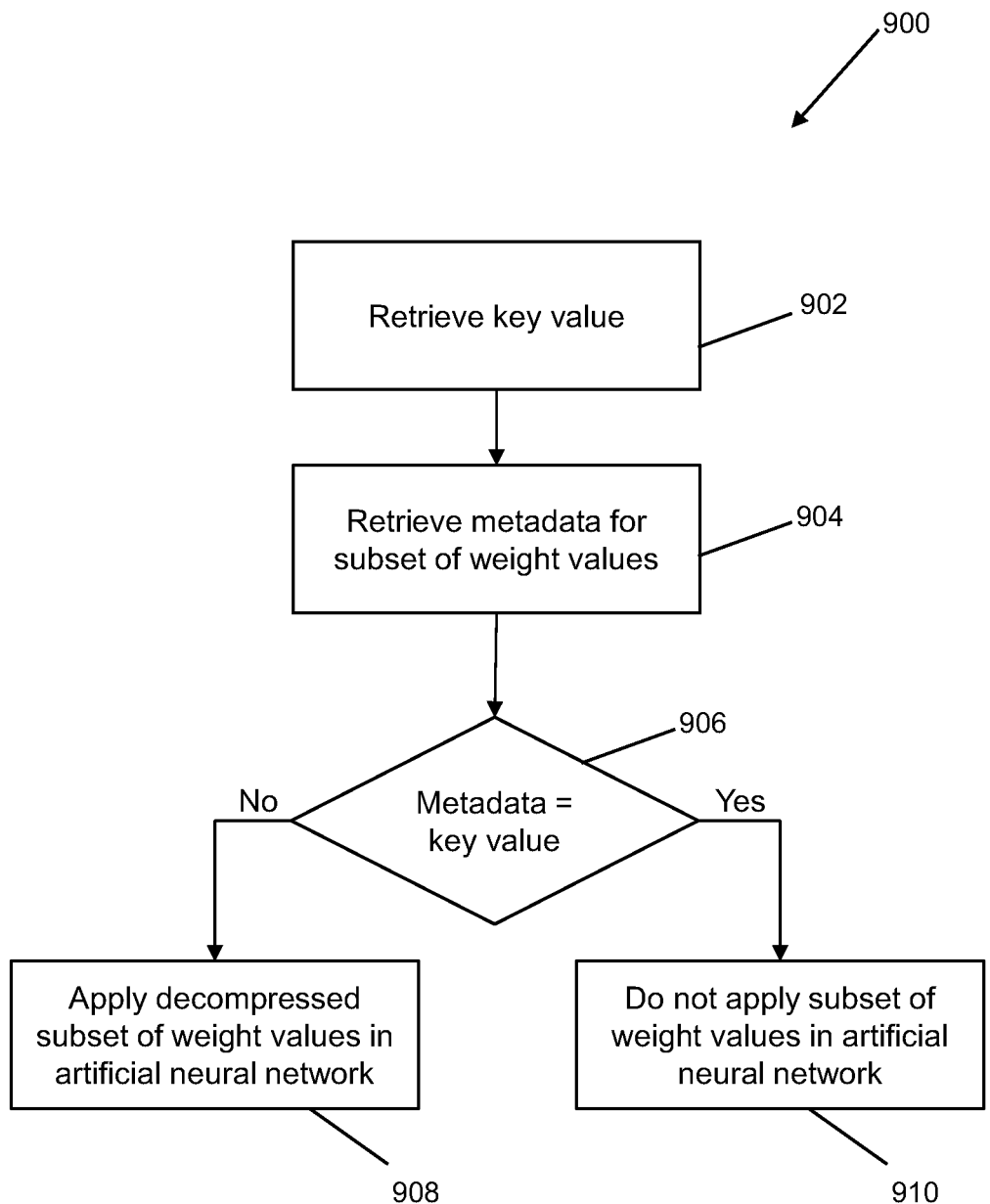
FIG. 9 shows a method of applying weight values for an artificial neural network based on metadata according to an embodiment of the technology described herein.

As discussed above, useful metadata can be generated when compressing the weight values using the image compression scheme. FIG. 9 shows a method 900 of applying weight values based on such metadata. In step 902, the GPU 106 retrieves a key value for the artificial neural network. In this embodiment, the key value identifies a partition having weight values which are equal to zero. Then, in step 904, the GPU 106 retrieves metadata in the form of a partition identifier for a subset (partition) of weight values from the memory 114. Then, in step 906, the GPU 106 determines whether the metadata is equal to the key value.

When the metadata for a given subset (partition) of weight values is not equal to the key value then, in step 908, the GPU 106 generates threads for applying the decompressed weight values for that subset (partition) in the artificial neural network. Conversely, when the metadata for a given subset (partition) of weight values is equal to the key value then, in step 910, the GPU 106 does not generate threads for applying the weight values for that subset (partition) in the artificial neural network.

Steps 904 and 906, and then either step 908 or 910, can be performed in respect of each one of plural subsets (partitions) of weight values. This can significantly reduce the amount of GPU processing resources needed when producing a result from an input to the artificial neural network by avoiding the need to execute threads for certain subsets (partitions) of weight values.

In other embodiments, the metadata may comprise a DC component value for a subset (block) of weight values and the key value may be zero. In yet other embodiments, the metadata can be compared to one or more key values to determine whether to apply a subset of weight values in an enhanced or suppressed manner.

In yet other embodiments, rather than the GPU 106, an image processor, or a dedicated neural network processor of a data centre, may be used to apply the weight values in the artificial neural network based on metadata.

Figure 10:
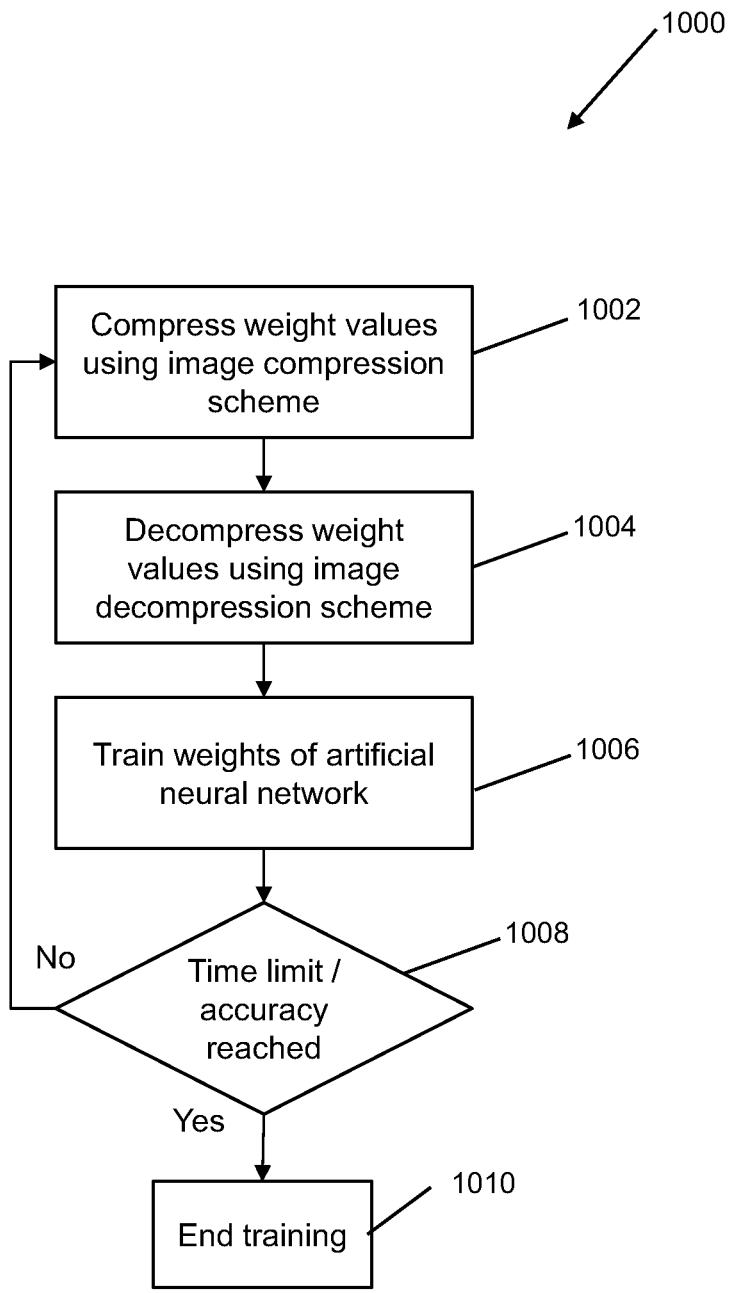
FIG. 10 shows a method of training weights for an artificial neural network according to an embodiment of the technology described herein.

In the embodiments described above, the image compression schemes are lossy. FIG. 10 shows a method 1000 of training an artificial neural network that can compensate for effects caused by such image compression schemes.

In step 1002, the GPU 106 uses the image compression scheme to compress the array of weight values to provide compressed weight data for the artificial neural network in a manner as discussed above. Then, in step 1004, the GPU 106 uses a corresponding image decompression scheme to decompress weight values for the artificial neural network in a manner as discussed above. This, in effect, replicates the errors in the decompressed weight values introduced by the lossy image compression scheme.

Then, in step 1006, the GPU 106 trains the artificial neural network using the decompressed weight values. Step 1006 can comprise one or more iterations of a training process in which weight values are modified to try to reduce or minimise an error metric. Then, in step 1008, it is determined whether or not a time limit or desired accuracy has been reached. When the time limit and desired accuracy has not been reached, the training method 1000 returns to steps 1002, 1004 and 1006 to perform another iteration in which the trained weight values are compressed, decompressed and then used when training the artificial neural network. Thus, the compression and decompression is taken into account when training the weight values. When the time limit and desired accuracy has been reached, the training method 1000 ends at step 1010. The trained weight values can then be compressed and stored in the memory 114 and/or later applied to produce a result using the artificial neural network.

In other embodiments, rather than the GPU 106, a dedicated neural network processor of a data centre may be used to perform the training of the weight values for the artificial neural network. In these embodiments, the compressed trained weight data may be provided to the data processing system 100 by the data centre. The data processing system 100 may then decompress and apply the trained weight values in the artificial neural network, for example using the GPU 106 in the manner discussed above.

In embodiments in which partitions are used when compressing and decompressing the weight values, the partitions can be preserved from training iteration to training iteration if desired. This can facilitate the training process by allowing the compression/decompression to be linear and thus able to be differentiated for back-propagation during training. Furthermore, in embodiments in which endpoints are determined when compressing the weight values and are used when decompressing the weight values, the endpoints can also be trained when training the weight values.

It can be seen from the above that embodiments of the technology described herein provide for efficient storage and processing of the weight values for an artificial neural network. This is achieved in embodiments of the technology described herein by compressing weight values for an artificial neural network using a compression scheme that has properties of an image compression scheme.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing a set of weight values for an artificial neural network, the method comprising:
    representing a set of weight values for an artificial neural network in the form of an array of weight values; and
    using an image compression scheme to compress the array of weight values to provide compressed weight data for the artificial neural network, wherein using the compression scheme includes generating metadata for one or more subsets of the set of weight values;
    wherein the metadata generated for one or more subsets of the set of weight values indicates a particular manner in which to apply the weight values of the one or more subsets of weight values in the artificial neural network.

2. A method as claimed in claim 1, wherein the compression scheme comprises a graphics texture compression scheme.

3. A method as claimed in claim 1, wherein the compression scheme allows selected decompressed weight values to be derived from the compressed weight data without decompressing all of the compressed weight data.

4. A method as claimed in claim 1, wherein using the compression scheme to compress the array of weight values comprises:
   partitioning the set of weight values into distinct subsets of weight values; and
   using different sets of compression parameters for the respective subsets of weight values.

5. A method as claimed in claim 1, further comprising:
   using an image decompression scheme to derive decompressed weight values from the compressed weight data for the artificial neural network; and
   training the artificial neural network using the decompressed weight values to provide a set of trained weight values for the artificial neural network.

6. A data processing apparatus for processing a set of weight values for an artificial neural network, the data processing apparatus comprising:
   weight processing circuitry configured to represent a set of weight values for an artificial neural network in the form of an array of weight values; and
   compression processing circuitry configured to use an image compression scheme to compress the array of weight values to provide compressed weight data for the artificial neural network, and generate metadata for one or more subsets of the set of weight values;
   wherein the metadata generated for one or more subsets of the set of weight values indicates a particular manner in which to apply the weight values of the one or more subsets of weight values in the artificial neural network.

7. A data processing apparatus as claimed in claim 6, wherein the compression scheme comprises a graphics texture compression scheme.

8. A data processing apparatus as claimed in claim 6, wherein the compression scheme allows selected decompressed weight values to be derived from the compressed weight data without decompressing all of the compressed weight data.

9. A data processing apparatus as claimed in claim 6, wherein the compression processing circuitry is configured to, when using the compression scheme to compress the array of weight values:
   partition the set of weight values into distinct subsets of weight values; and
   use different sets of compression parameters for the respective subsets of weight values.

10. A data processing apparatus as claimed in claim 6, further comprising:
    decompression processing circuitry configured to use an image decompression scheme to derive decompressed weight values from the compressed weight data for the artificial neural network; and
    artificial neural network processing circuitry configured to train the artificial neural network using the decompressed weight values to provide a set of trained weight values for the artificial neural network.

11. A non-transitory computer readable storage medium storing computer software code which when executing on a processor of a data processing apparatus performs a method of processing a set of weight values for an artificial neural network, the method comprising:
    representing a set of weight values for an artificial neural network in the form of an array of weight values; and
    using an image compression scheme to compress the array of weight values to provide compressed weight data for the artificial neural network, wherein using the compression scheme includes generating metadata for one or more subsets of the set of weight values;
    wherein the metadata generated for one or more subsets of the set of weight values indicates a particular manner in which to apply the weight values of the one or more subsets of weight values in the artificial neural network.

* * * * *